US008762956B1

(12) United States Patent
Simoneau et al.

(10) Patent No.: US 8,762,956 B1
(45) Date of Patent: Jun. 24, 2014

(54) GENERATING A REPORT DOCUMENT FROM CODE

(75) Inventors: Matthew J. Simoneau, Boston, MA (US); Edward Whittington Gulley, Watertown, MA (US)

(73) Assignee: The MathWorks, Inc., Natick, MA (US)

( * ) Notice: Subject to any disclaimer, the term of this patent is extended or adjusted under 35 U.S.C. 154(b) by 1494 days.

(21) Appl. No.: 11/700,276

(22) Filed: Jan. 31, 2007

(51) Int. Cl.
*G06F 9/44* (2006.01)

(52) U.S. Cl.
USPC .......................................... 717/130; 717/125

(58) Field of Classification Search
None
See application file for complete search history.

(56) References Cited

U.S. PATENT DOCUMENTS

| | | | | | |
|---|---|---|---|---|---|
| 4,787,035 | A | * | 11/1988 | Bourne | 700/247 |
| 4,819,233 | A | * | 4/1989 | Delucia et al. | 717/129 |
| 4,949,255 | A | * | 8/1990 | Gerth et al. | 719/315 |
| 5,265,254 | A | * | 11/1993 | Blasciak et al. | 717/130 |
| 5,317,740 | A | | 5/1994 | Sites | |
| 5,450,586 | A | * | 9/1995 | Kuzara et al. | 717/124 |
| 5,513,305 | A | | 4/1996 | Maghbouleh | |
| 5,687,375 | A | * | 11/1997 | Schwiegelshohn | 717/129 |
| 5,729,676 | A | | 3/1998 | Inoue | |
| 5,748,878 | A | * | 5/1998 | Rees et al. | 714/38.13 |
| 5,956,510 | A | | 9/1999 | Nicholas | |
| 6,049,666 | A | * | 4/2000 | Bennett et al. | 717/130 |
| 6,077,311 | A | * | 6/2000 | Lichtenstein et al. | 717/128 |
| 6,094,530 | A | * | 7/2000 | Brandewie | 717/127 |
| 6,106,571 | A | * | 8/2000 | Maxwell | 717/131 |
| 6,161,216 | A | * | 12/2000 | Shagam | 717/128 |
| 6,189,142 | B1 | * | 2/2001 | Johnston et al. | 717/125 |
| 6,226,791 | B1 | | 5/2001 | Carter et al. | |
| 6,256,637 | B1 | * | 7/2001 | Venkatesh et al. | 1/1 |
| 6,311,324 | B1 | | 10/2001 | Smith et al. | |
| 6,311,326 | B1 | * | 10/2001 | Shagam | 717/128 |
| 6,311,327 | B1 | * | 10/2001 | O'Brien et al. | 717/114 |
| 6,401,087 | B2 | | 6/2002 | Yanagimoto | |
| 6,654,949 | B1 | * | 11/2003 | Fraenkel et al. | 717/130 |
| 6,792,595 | B1 | | 9/2004 | Storistenau et al. | |
| 6,832,182 | B1 | * | 12/2004 | Wilson, Jr. | 703/13 |
| 6,874,140 | B1 | * | 3/2005 | Shupak | 717/131 |
| 6,957,366 | B1 | | 10/2005 | McDonald | |
| 6,961,925 | B2 | * | 11/2005 | Callahan et al. | 717/128 |
| 6,973,417 | B1 | * | 12/2005 | Maxwell et al. | 703/2 |
| 7,069,547 | B2 | | 6/2006 | Glaser | |
| 7,100,028 | B2 | | 8/2006 | McGrath et al. | |
| 7,231,633 | B2 | * | 6/2007 | Grassens | 717/124 |
| 7,240,340 | B2 | | 7/2007 | Vaidyanathan et al. | |
| 7,353,427 | B2 | | 4/2008 | Bates et al. | |

(Continued)

OTHER PUBLICATIONS

Larus, James R. et al., "EEL: Machine-Independent Executable Editing," Proceedings of the ACM SIGPLAN Conference on Programming Language Design and Implementation (PLDI), pp. 291-300 (1995).

(Continued)

*Primary Examiner* — Jason Mitchell
(74) *Attorney, Agent, or Firm* — Nelson Mullins Riley & Scarborough LLP

(57) ABSTRACT

Exemplary embodiments enable the generation of a report document. Exemplary embodiments identify a section of code for evaluation and insert at least one command for generating a report document into the section of code. An evaluation of the section of code is initiated and data is collected that is related to the evaluation of the section of code when the at least one command for generating a report document is evaluated.

23 Claims, 14 Drawing Sheets

(56) References Cited

U.S. PATENT DOCUMENTS

| | | | |
|---|---|---|---|
| 7,496,906 B2 | 2/2009 | Black-Ziegelbein et al. | |
| 7,526,753 B2 | 4/2009 | Spencer et al. | |
| 7,536,682 B2 | 5/2009 | Dankel et al. | |
| 7,765,532 B2 | 7/2010 | Dutt et al. | |
| 2001/0042173 A1 | 11/2001 | Bala et al. | |
| 2002/0013938 A1 | 1/2002 | Duesterwald et al. | |
| 2002/0087949 A1* | 7/2002 | Golender et al. | 717/124 |
| 2002/0099765 A1* | 7/2002 | Otis | 709/203 |
| 2002/0129339 A1* | 9/2002 | Callahan et al. | 717/127 |
| 2002/0138787 A1* | 9/2002 | Pal et al. | 714/38 |
| 2003/0023961 A1 | 1/2003 | Barsness et al. | |
| 2003/0093720 A1 | 5/2003 | Miyao et al. | |
| 2003/0097652 A1* | 5/2003 | Roediger et al. | 717/160 |
| 2003/0196196 A1 | 10/2003 | Nylander et al. | |
| 2004/0128653 A1* | 7/2004 | Arcand | 717/124 |
| 2004/0221278 A1 | 11/2004 | Dankel et al. | |
| 2005/0015751 A1* | 1/2005 | Grassens | 717/130 |
| 2005/0028107 A1 | 2/2005 | Gomes et al. | |
| 2005/0172277 A1* | 8/2005 | Chheda et al. | 717/151 |
| 2005/0210416 A1 | 9/2005 | MacLaurin et al. | |
| 2006/0101416 A1* | 5/2006 | Callahan et al. | 717/128 |
| 2006/0168569 A1* | 7/2006 | Smith et al. | 717/124 |
| 2006/0195822 A1* | 8/2006 | Beardslee et al. | 717/124 |
| 2007/0006172 A1* | 1/2007 | Swoboda et al. | 717/131 |
| 2007/0180439 A1* | 8/2007 | Sundararajan et al. | 717/158 |

OTHER PUBLICATIONS

Ryder, Barbara G. et al., "Change Impact Analysis for Object-Oriented Programs," Proceedings of the 2001 ACM SIGPLAN-SIGSOFT Workshop on Program Analysis for Software Tools and Engineering, pp. 46-53 (2001).

Cooper, Keith D. et al., "The Impact of Interprocedural Analysis and Optimization on the Design of a Software Development Environment," Proceedings of the ACM SIGPLAN '85 Symposium on Language Issues in Programming Environments, vol. 20(7) (1985).

Diaconescu, Roxana E. et al., "Automatic Distribution of Java Byte-Code Based on Dependence Analysis," pp. 1-14 (2003).

Pawletta, S. et al., "A MATLAB Toolbox for Distributed and Parallel Processing," retrieved online at http://citeseer.ist.psu.edu/cache/papers/cs/2321/http:zSzzSzwww.mb.hswismar.dezSzMitarbeiterzSzPawletazSzForschungzSzPublikationenzSzzz5_matlab95.pdf/pawletta95matlab.pdf, 6 pages (1995).

European Office Action for Application No. 06845243.2, 6 pages, dated Mar. 3, 2011.

* cited by examiner

```
%% Square Wave from Sine Waves
% The Fourier series expansion for a square-wave is
% made up of a sum of odd harmonics.  We show this
% graphically using MATLAB.

function newxfourier
%%
% Start by forming a time vector running from 0 to
% 10 in steps of 0.1.

t = 0:.1:pi*4;
y = sin(t);
plot(t,y);

%%
% In each iteration of the loop, add another odd
% harmonic.  As "k" increases, the output
% approximates a square wave with increasing
% accuracy.

x = zeros(size(t));
for k = 1:2:7
    %%
    % Display "k", add another harmonic
    % to "x", and plot the result.

k
    x = x + sin(k*t)/k;
    plot(t,x)

%%
end
%%
% Even though the approximations are constantly
% improving, they will never be exact because of
% the Gibbs phenomenon, or ringing.
```

*Fig. 1*

Square Wave from Sine Waves ←—220

The Fourier series expansion for a square-wave is made ←—221
up of a sum of odd harmonics. We show this graphically
using MATLAB.

```
function newxfourier
```
←—222

Start by forming a time vector running from 0 to 10 in steps of 0.1.

```
t = 0:.1:pi*4;
y = sin(t);
plot(t,y);
```
←—231

In each iteration of the loop, add another odd harmonic. As "k" increases, the output approximates a square wave with increasing accuracy.    } 212

```
x = zeros(size(t));
for k = 1:2:7
```

Display "k", add another harmonic to "x", and plot the result.

```
    k
    x = x + sin(k*t)/k;    ←—255
    plot(t,x)
    k =
        1
```

GENERATING A REPORT DOCUMENT FROM CODE

BACKGROUND

Some programming environments allow a user to generate a report document that incorporates the code developed by the user. These environments may also allow the user to incorporate evaluation results in the generated report document. To achieve this, the user typically develops the code in discrete cells such that each cell of the code is syntactically complete and can be evaluated independently from the other cells in the code. Using this modular approach, each cell of the code is independently evaluated, and the output of each cell can be incorporated into a report document.

SUMMARY

The conventional approach described above has a number of drawbacks. Since each cell is evaluated independently using the modular approach, the user may be prohibited from creating code that includes, for example, a cell that partitions multi-line statements, such as "while", "if" or "for" loops. In some instances the entire code can be contained within a single cell, thereby allowing multi-line statements to be included in the code. However, a report document generated from a cell that encompasses the entire code may not allow for interleaving sections of the code with data that results from the evaluation of the corresponding sections of code.

Further, some programming environments that support both scripts and functions may provide separate workspaces for evaluating the scripts and functions. Conventionally, the modular approach operates only in the script workspace, and therefore, the conventional modular approach may not properly evaluate code that uses a separate function workspace.

In one embodiment of the exemplary environment, a computer-implemented method of generating a report document for a computed code is used. The method includes identifying a section of the code for evaluation and inserting at least one command for generating a report document into the section of the code. The method also includes initiating an evaluation of the section of the code and collecting data related to the evaluation of the section of the code when the at least one command for generating a report document is evaluated.

Another embodiment is a computer-readable medium that holds instructions for generating a report document for a computed code. The instructions enable identifying a section of the code for evaluation and inserting at least one command for generating a report document into the section of the code. The instructions further enable initiating an evaluation of the section of the code and collecting data related to the evaluation of the section of the code when the at least one command for generating a report document is evaluated.

Yet another embodiment is a method in a computing environment. The method includes obtaining a section of code for evaluation by the computing environment, where the section of code for evaluation includes at least one multi-line statement and at least one command for generating a report document. The at least one command for generating a report document partitions the at least one multi-line statement. The method also includes initiating evaluation of the section of the code and collecting data related to the evaluation of the section of the code when the at least one command for generating the report document is evaluated. The method further includes generating a report document that includes the data related to the evaluation of the section of the code.

Still another embodiment is a system that includes a computing environment, a simulation engine and a report generator. The computing environment provides a section of code that includes at least one multi-line statement and at least one command for generating a report document that concerns at least a portion of the section of code. The at least one command for generating a report document partitions the at least one multi-line statement. The simulation engine evaluates the section of code and collects data related to the section of code when the at least one command for generating a report document is evaluated. The report generator generates a report document that includes the data related to the evaluation of the section of code.

An additional embodiment is a medium on a computing system that holds instructions executable using the computing system. The instructions enable obtaining code for evaluation. The code includes at least one multi-line statement and at least one command for generating a report document that concerns at least a portion of the code, where the at least one command for generating a report document partitions the at least one multi-line statement. The instructions also enable initiating evaluation of the code and collecting data related to the code when the at least one command for generating the report document is evaluated. The instructions further enable generating a report document that comprises the data related to the evaluation of the code.

A further embodiment is a medium on a computing system. The medium holds executable instructions that enable obtaining code for evaluation by a computing environment, where the code for evaluation includes a plurality of commands for generating a report document that concerns at least a portion of the code. The instructions also enable initiating evaluation of the code and collecting data related to the evaluation of the code when the commands for generating the report document are evaluated. The instructions further enable generating a report document that includes the data related to the evaluation of the code.

BRIEF DESCRIPTION OF THE DRAWINGS

The accompanying drawings, which are incorporated in and constitute a part of this specification, illustrate one or more exemplary embodiments and, together with the description, explain the invention. In the drawings, FIG. 1 depicts exemplary code that may be provided in an editor;

DETAILED DESCRIPTION

Figure 2A:
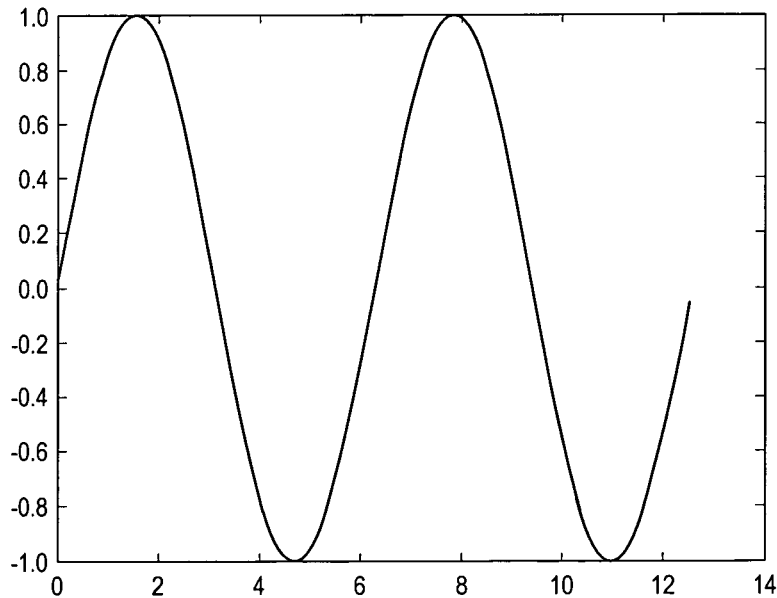
FIGS. 2A-E depict exemplary sections of a report document that may be generated from the evaluation of the code of FIG. 1.

Exemplary embodiments may generate a report document regarding programming languages instructions ("code"). The report document may be generated by partitioning the code into sections and initiating an evaluation of the code. The evaluation may evaluate the code in a single evaluation or in multiple evaluations. At the end of each section of the code, evaluation of the code may be paused. Information regarding the code, such as outputs generated while the code is being evaluated, may be collected while the evaluation is paused or during the evaluation. The collected information may then be used to generate the report document.

For purposes of this document, the terms "evaluation" and "execution" are interchangeable and may refer to the simulation or execution of a compiled language and/or an interpretive language. Further, all variations of the terms "evaluation" and "execution", such as, for example, "evaluated" and "executed" are also interchangeable.

Evaluating the code in a single evaluation allows the commands for generating a report document to partition the code into sections that are not syntactically complete. For example, the command for generating a report document may partition a multi-line statement such that a portion of the multi-line statement is in one section of the code and another portion of the multi-line statement is in another portion of the code. While the sections of the code in this example contain syntactically incomplete portions of the multi-line statement, the multi-line statement may be evaluated in its complete form because the sections of code are evaluated as a single evaluation.

The report document may include, for instance, a listing of the code and/or outputs collected during the evaluation of the code. The report document may interleave the outputs collected during the evaluation of the code with the listing of the code so that each code section listed in the report is preceded or followed by an output that was collected for the associated section. The report document may contain other information, such as information resulting from analysis of the code or of the collected outputs. The report may include additional content as well, such as, for example, expository text, variable values, state information, execution time, etc.

Providing a report document allows the user to view information related to the evaluation of the code in a clear and intuitive manner. By interleaving the information that is collected from the evaluation of the code and the listing of the code a user may quickly identify the sections of the code that correspond to the information collected. In addition, including information, such as an execution time, in the report document may allow the user to ascertain information that may aid in debugging certain aspects of the code.

The code may be sectioned based on an insertion of a command for generating the report document or a delimiting notation. The commands for generating a report document or delimiting notations may partition multi-line statements in the code. When a delimiting notation is inserted, a command for generating a report document may be inserted in place of the delimiting notation, or immediately preceding or following the delimiting notation. During an evaluation of the code, a command for generating a report document may cause the evaluation of the code to pause to collect information related to the evaluation.

In one embodiment, the command for generating a report document may be explicitly inserted into the code by a user. For example, the user may insert commands for generating a report document at various locations in the code, thereby generating sections in the code. Each time the commands for generating a report document are evaluated, information related to the evaluation is collected that corresponds to a section.

In another embodiment, the user may insert a delimiting notation into the code. The delimiting notation may be inserted at various locations in the code to generate sections in the code. Before or during evaluation of the code, a command for generating a report document may be inserted in place of the delimiting notation, or immediately preceding or following the delimiting notation.

In yet another embodiment, the commands for generating a report document may be automatically inserted into the code. For example, the commands for generating a report document may be inserted based on a structure of the code. The command for generating a report document may be automatically inserted at various locations in the code to generate sections in the code before or during the evaluation of the code.

For embodiments that allow a delimiting notation and/or that allow automatic insertion, the commands for generating the report document that are inserted may be temporarily or permanently inserted. The insertion may occur during or before the evaluation of the code. When the command for generating a report document has been inserted temporarily, the command may be removed after it is executed or when the evaluation of the code is complete. The commands for generating a report document that are temporarily inserted into the code may or may not be visible to the user. The command for generating a report document and/or the delimiting notation can take many forms, such as, for example, a character, string of characters, etc., or can be a geometric shape, such as a circle, a square, a rectangle, an arrow, etc.

Exemplary embodiments for inserting a command for generating a report document allow flexibility in generating a report document and developing code. Allowing a user to insert the commands for generating a report document or delimiting notations in the code provides the user with control of when information is collected from the evaluation. The user may also control how the information that is collected and the listing of the code are interleaved based on the placement of the inserted commands for generating a report document or delimiting notations. Allowing automatic insertion of the commands for generating a report document may provide a user with standard structured report documents that provide standard information based on the structure of the code. The automatic insertion may also save the user time by relieving the user of the burden of determining where to insert the commands for generating a report document.

An example is helpful in explaining exemplary embodiments. FIG. 1 depicts exemplary code 100 that is being edited in an editor 150. The editor 150 may include a pane 195 that allows a user to develop and edit code 100. The code 100 can include delimiting notations 101-106. In this example the delimiting notations 101-106 are represented by "%%".

During the evaluation of the code 100, the delimiting notations 101-106 are replaced with commands for generating a report document (hereinafter delimiting notations 101-106 are referred to as commands for generating a report document 101-106 to reflect that replacing). The commands for generating a report document may be removed after the evaluation of code 100. When the commands for generating a report document 101-106 are evaluated, the evaluation can pause to collect and optionally save information from the evaluation of the code 100. The portions of code 100 between the commands for generating a report document 101-106 can be referred to as sections of the code 100. The commands for generating a report document 101-106 produce a section 110-115 of code 100.

The report document is generated using a report generating tool that formats sections 111-115 of the code 100 and associated information collected during the evaluation. The report generating tool is discussed in more detail below. FIGS. 2A-E depict sections of a report document that can be generated from the evaluation of the code 100.

FIG. 2A depicts a section 210 of the report document that corresponds to the section 110 and a section 211 of the report document that corresponds to the section 111. As depicted in FIG. 2A, the section 210 includes a report document title 220, text 221 and text 222. When the user includes text 120 following a command for generation of a report document that is on the same line as the command for generation of a report document in the code 100, the programming environment 100 inserts the title 220 line into the report document that includes the text 120 from the code. Comments 121 in the code 100, which are indicated by lines that begin with a single percentage sign ("%"), are also inserted into the report document as text 221. The code segment 122 in the code 100 is inserted into the report document as text 222.

The format the title 220, the text 221 and the text 222 may take several forms. For example, the title 220, the text 221 representing comments 121 and/or the text 222 representing a code segment 122 can be represented in a larger font then the rest of the report document, in a different color, in a highlighted fashion or underlined. Further, the report document may create hypertext links for the title 220, the text 221 and/or the text 222 to allow a user to navigate from the report document to the corresponding section in the code 100.

Figure 2B:
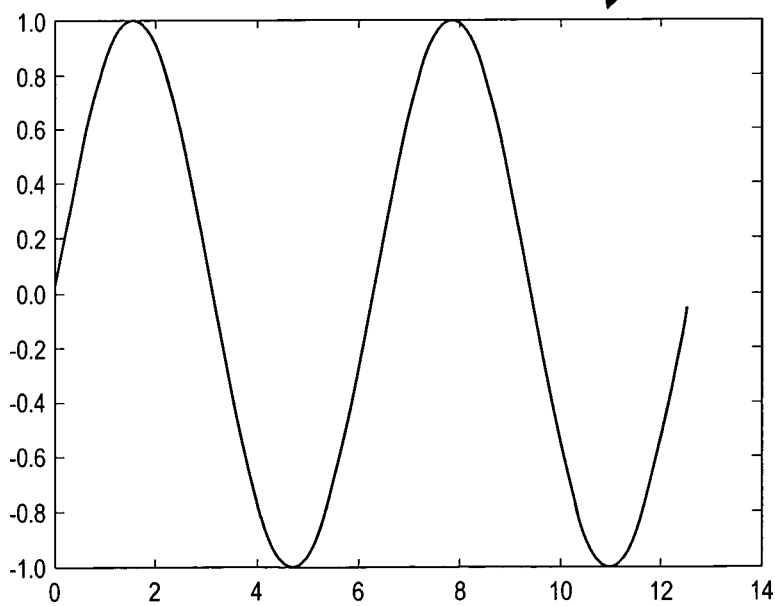
Figure 2C:
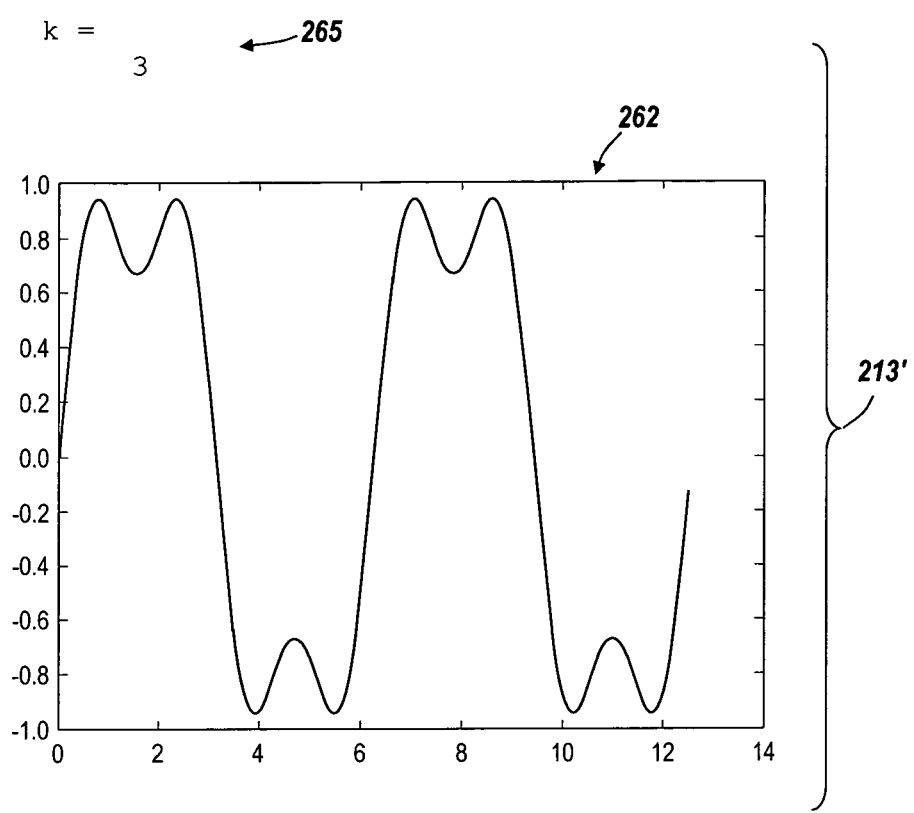
Figure 2D:
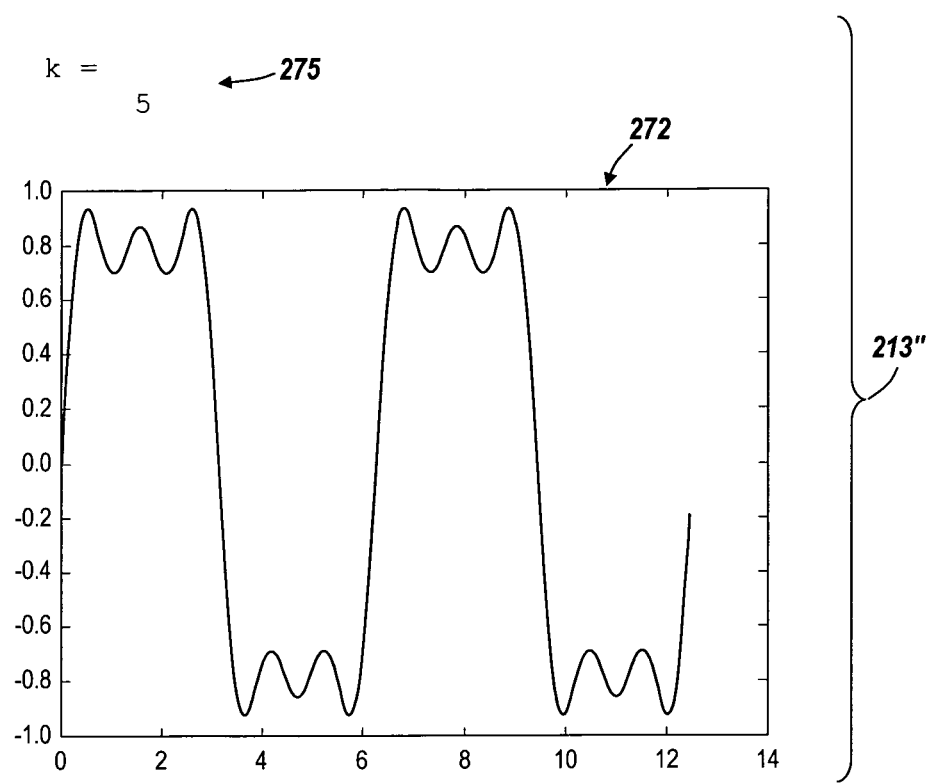
Figure 2E:
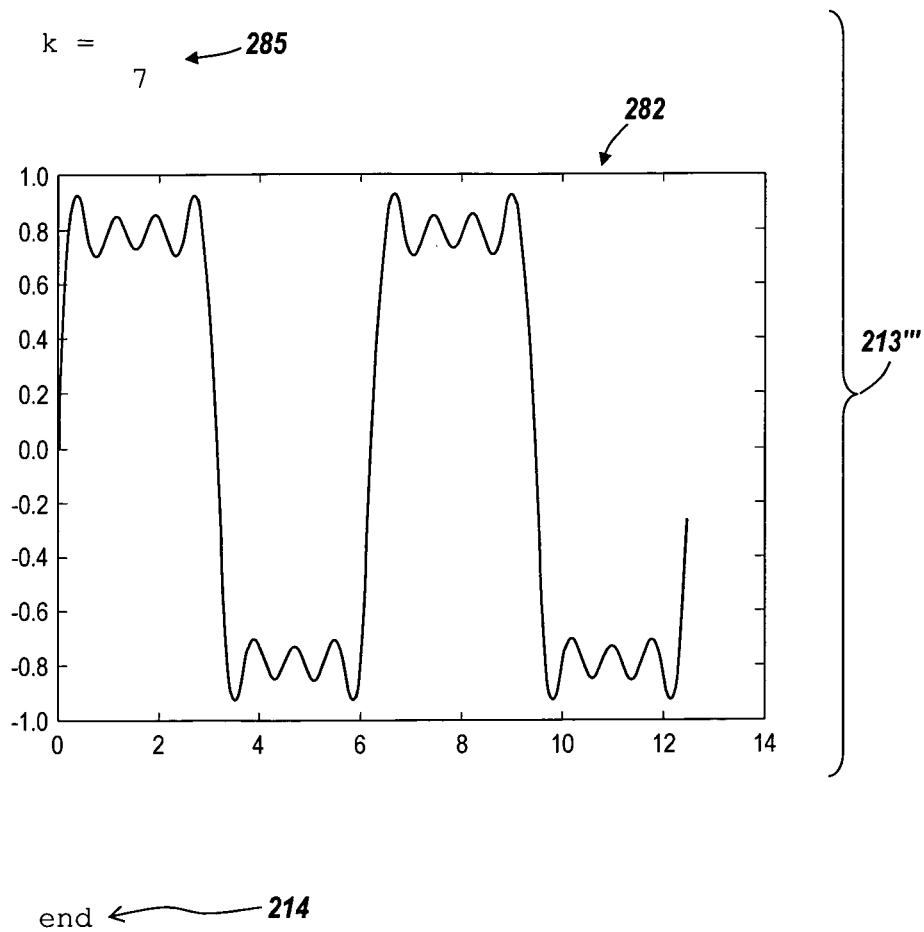

FIG. 2B depicts a section 212 of the report document that corresponds to the section 112 and a section 213 of the report document that corresponds to the section 113. FIG. 2C depicts a section 213' of the report document that corresponds to the section 113. FIG. 2D depicts a section 213" of the report document that corresponds to the section 113. FIG. 2E depicts a section 213''' of the report document that corresponds to the section 113, a section 214 of the report document that corresponds to the section 114 and a section 215 of the report document that corresponds to the section 115.

In the example of a generated report document, as depicted in FIG. 2A-E, the generated report document includes outputs from the evaluation of the code 100. For example, a graph 232 represents an output from the evaluation of a code segment 135 in section 111 of the code 100; and graphs 252, 262, 272 and 282 represent an output from the evaluation of a code segment 151 that overlaps sections 112 and 113 of the code 100.

The graphs 252, 262, 272 and 282 each represent an intermediate output of the code segment 151. The code segment 151 is a multi-line statement that implements a "for" loop. It is observed that the commands for generating a report document 104 and 105 partition the multi-line statement. For each iteration of the "for" loop, the command for generating a report document 104 is evaluated causing the intermediate outputs represented by the graphs 252, 262, 272 and 282 to be incorporated into the report document.

The code segment 151, also outputs a value for the variable "k" 152. The "for" loop increments the value of the variable "k" 152 from 1 to 7 by a value of 2 for each iteration. In this example, therefore, the "for" loop of code segment 151 performs four iterations producing intermediate outputs of k=1, k=3, k=5 and k=7, respectively. The commands for generating a report document incorporate these intermediate outputs as represented by report document sections 255, 265, 275 and 285. Moreover, the commands for generating the report document incorporate the code segment 135 in section 111 of the code 100 as represented by report document section 231.

The report document can be represented in various formats. For example, a user may be able to select a desired format for the report document. Some examples of formats that the report document can use include a binary format, such as a word processing format (e.g., a Microsoft Word® document from Microsoft Inc. of Redmond, Wash.), a plain text format, a mark-up language document (e.g., a HTML document), a graphics format (e.g. PDF from Adobe Inc.), a custom document format, etc.

Figure 3:
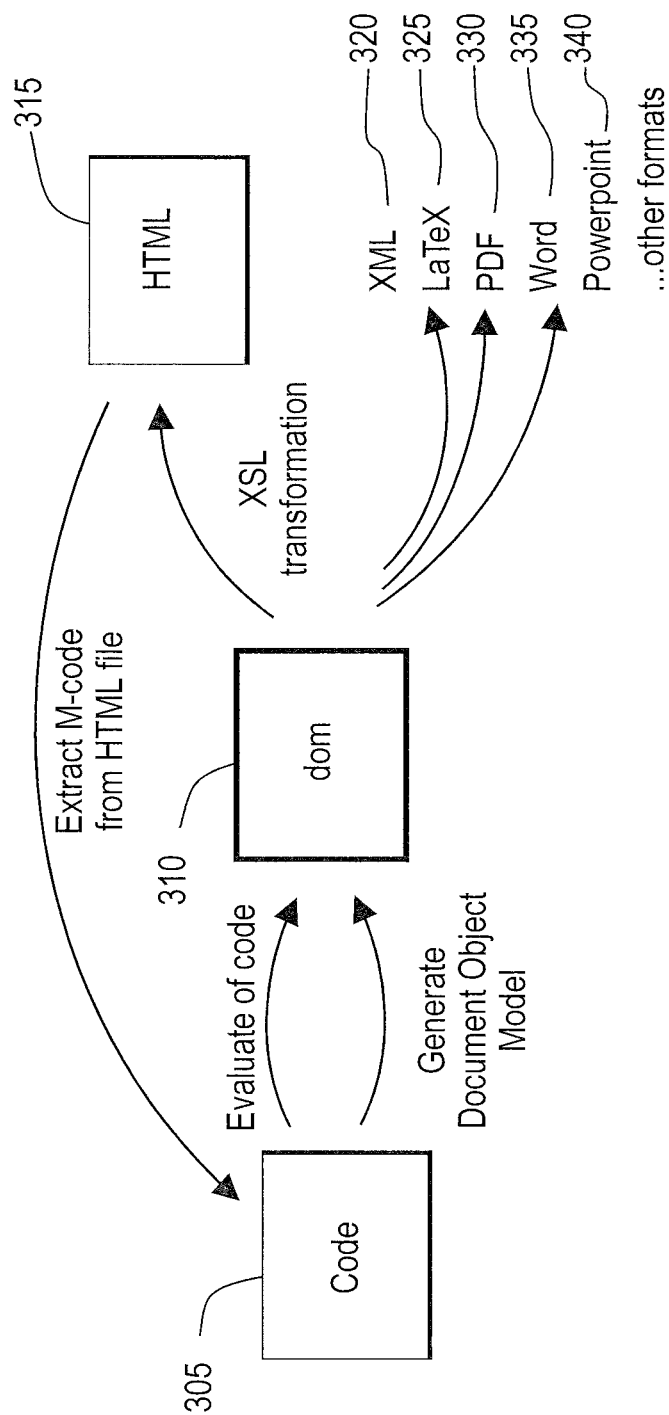
FIG. 3 is an exemplary block diagram representation of the conversion process engaged in by exemplary embodiments to publish code in a user-selected format.

FIG. 3 is a block diagram of the XML-based architecture that can be utilized by exemplary embodiments to convert code and information that is collected from the evaluation of the code to a report document in a format selected by a user. The code 305 is evaluated such that a single evaluation may encompass multiple commands for generating a report document that are included in the code 305, where the commands may partition a multi-line statement and/or may be evaluated in a distinct workspace. Code 305 is used as the basis of a document object model (DOM) 310. Data resulting from the evaluation of the code may also be used as a basis of the DOM 310. The DOM 310 may represent information in a tree structure and may allow access to information represented by the DOM 310 using languages with object oriented features (e.g., JavaScript). The tree structure may enable traversing back and forth between the DOM 310 and the code 305 and/or data resulting from the evaluation of the code 305. In other embodiments a Simple API for XML (SAX) may be used in place of the DOM 310. The user is able to select a desired format and convert the DOM 310 into a report document of a single format. For example, the user may choose to convert the code 305 and data resulting from the code into an HTML document 315.

Alternatively, the user may choose to publish an XML document 320, a LaTeX document 325, a PDF document 330, a Microsoft Word® document 335, a Microsoft PowerPoint® document 340 or some other type of document. XSL templates may be used to transform the document object model 310 into the user-selected format. The XSL templates provide general forms that are applied to the document object model 310 so that the report document that is generated adheres to the semantics of the type of document chosen to publish the report document. With Microsoft PowerPoint® documents, each code cell is displayed as a separate slide. A slideshow of the published slide allows a user to view the evaluation of each code cell thus presenting a narrative effect. Embodiments of the present invention also allow code to be extracted from a published HTML file and converted and imported back to the editor 150.

To initiate the publishing process, the user may be provided with the publish button 190 in the editor 150. When the user selects the publish button 190, the publishing process that is depicted in FIG. 3 begins. Alternatively, the user may type, in a command line interface, a command that initiates the publishing process. For example, the user may be able to type the word "publish" in the command line interface to initiate the publishing process that is depicted in FIG. 3. The user may type the publish command followed by a file name to indicate which file of code the user wants to generate a report document for. In addition, the programming environment can provide that if no file name follows the publish command that, by default, the last file that was published is republished.

Figure 4:
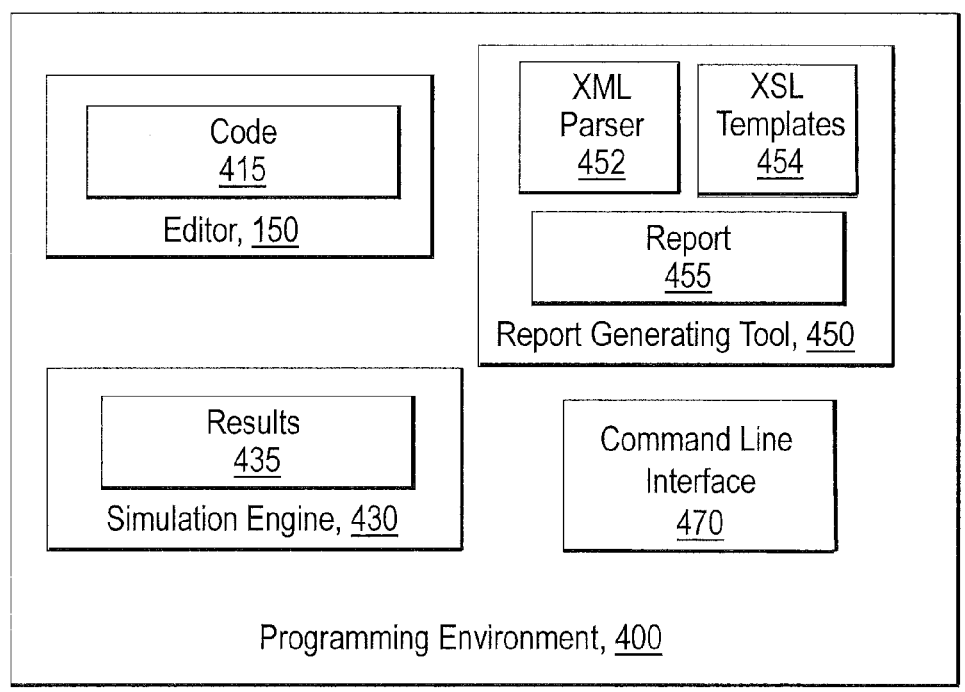
FIG. 4 depicts a high-level block diagram of an exemplary programming environment that may be used for implementing exemplary embodiments.

FIG. 4 is a high-level block diagram of an exemplary programming environment 400 for developing, evaluating, analyzing code as well as for generating a report document. The code may represent a model of a system, such as a dynamic system. The programming environment 400 can include an editor 150, a simulation engine 430, a report generating tool 450 and a command line interface 470. The simulation engine 430 may communicate with the editor 150 and optionally with the command line editor 470. The simulation engine 430 may receive code 415 from the editor 150 and/or may optionally receive code 415 from the command line editor 470. The simulation engine 430 may evaluate code 415 and may generated data 435 from the evaluation of code 415. The report generating tool 450 may receive code 415 from the editor 150 and may receive data 435 that results from the evaluation of the code 415 performed by the simulation engine 430. One example of the programming environment 400 may be MATLAB® from The MathWorks, Inc. of Natick, Mass.

A user may develop the code 415 with the editor 150 using a programming language, such as C, C++, Fortran, Java, MATLAB®, etc. Alternatively, if the code 415 has been previously developed, the user may open the code 415 with the editor 150. The code 415 may also be used for generating a report document 455 with the report generating tool 450. The report generating tool 450 generates the report document 455 using the code 415 and data 435 that results from evaluation of the code 415. The report generation tool 450 may integrate the code 415 and the data 435 into the report document 455.

The simulation engine 430 may provide for the evaluation of an interpretive programming language, such as MATLAB® from The MathWorks, Inc. of Natick, Mass. Such a simulation engine 430 may be referred to as an interpreter. An interpreter may translate a statement into a lower level language, such as an assembly language or machine language and may evaluate the statement before translating the next statement.

In the alternative, the simulation engine 430 may execute a compiled version of the code. The compiled version of code may be compiled by a compiler and may be referred to as an executable of the code or bytecode. For a compiled simulation, the entire code may be translated by the compiler into a lower level language, such as an assembly language or a machine language before the code is executed.

In some instances, the simulation engine 430 may include both an interpreter and a compiler, and may perform a mixture of interpretive and compiled simulations. For purposes of this document, the terms "evaluation" and "execution" are interchangeable and may refer to the simulation of a compiled language and/or an interpretive language. Further, all variations of the terms "evaluation" and "execution", such as, for example, "evaluated" and "executed" are also interchangeable.

The report generating tool 450 may utilize an XML parser 452 and eXtensible Stylesheet Language (XSL) templates 454. The XML parser 452 may be used to parse code into a document object model. The XSL templates 454 may be used to convert the document object model into report documents of a user-specified format. The XSL templates may provide a structured form for converting the document object model into a report document that is uses for a particular format. For example, there may be an XSL template that is related to converting the document object model into a Microsoft Word® document, a hypertext document (e.g., an HTML document), etc.

The command line interface 470, allows a user to enter textual commands that can control the initiation of the evaluation of the code 415, the generating of the report document 455 as well as various other aspects. The command line interface 470 can also allow a user to enter commands to be evaluated by the simulation engine 430. The evaluation of these commands may occur in a base workspace, which is discussed in more detail below, and the data 435 resulting from the evaluation of code 415 can be made available to any code that is evaluated in the base workspace.

Figure 5:
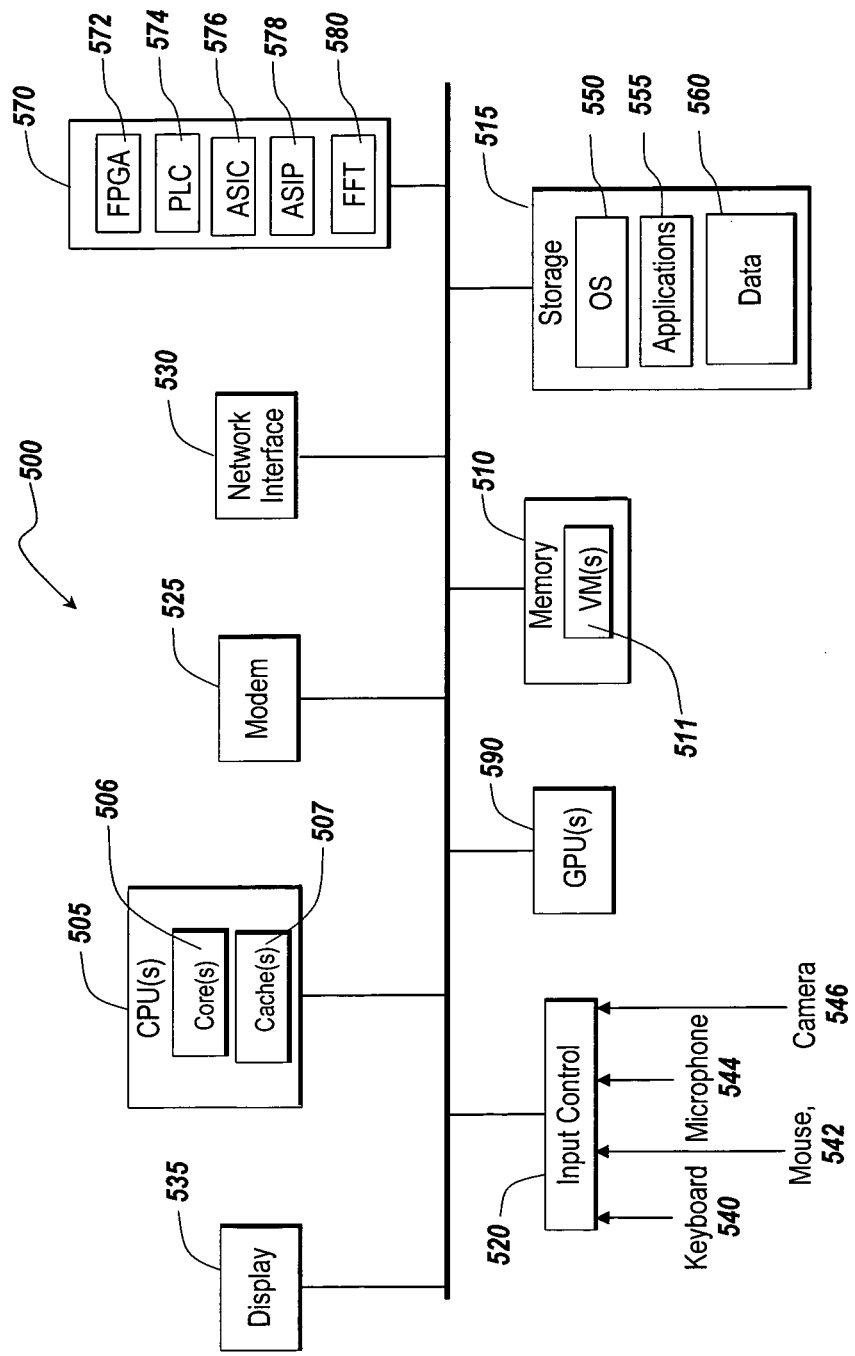
FIG. 5 depicts an exemplary computing device suitable for practicing exemplary embodiments.

One of ordinary skill in the art will also appreciate that the editor 150, simulation engine 430, report generating tool 450 and command line interface 470 may be provided on a single computing device, with reference to FIG. 5, on multiple computing devices (e.g., in a distributed configuration and/or in other configurations (e.g., a multi-core implementation operating one or more platforms).

FIG. 5 is an exemplary computing device 500 suitable for practicing exemplary embodiments. The implementation of FIG. 5 is illustrative and not limiting. The computing device 500 may take many forms, including but not limited to a workstation, server, network computer, quantum computer, optical computer, bio computer, Internet appliance, mobile device, a pager, a tablet computer, etc.

The computing device 500 may include electronic and/or optical components and may include a Central Processing Unit (CPU) 505, memory 510, storage 515, an input control 520, a modem 525, a network interface 530, a display 535, processor 570 and graphical processing unit (GPU) 590. The CPU 505 may control each component of the computing device 500 to provide the editor 150, simulation engine 430 and/or report generating tool 450. The memory 510 may store instructions and/or data and provides them to the CPU 505 so that the CPU 505 may operate the computing device 500

Optionally, the computing device 500 may include multiple CPUs 505 for executing software loaded in the memory 510, and/or for executing other programs for controlling system hardware and/or system software. Each of the CPUs 505 may be a single or a multiple core processor 506. The code loaded in the memory 510 may run in a virtualized environment, such as in a Virtual Machine (VM) 511. Multiple VMs 511 may be resident on a single processor, such as cores 506. Also, part of the application could be run on processing device 570, which can include, for example, a field programmable gate array (FPGA) 572, a programmable logic controller (PLC) 574, an application specific integrated circuit (ASIC) 576, an application specific instruction set processor (ASIP) 578, a Fast Fourier Transform (FFT) processing device 580, etc. In alternative implementations, portions of the applications may be run on analog electronic devices that may be included in the computing device 500. In still other alternative implementations, other resources may be used to run part of an application, such as GPU 590.

The storage 515 may contain instructions related to applications, such as software tools for applications operating with the computing device 500. The storage 515 can include code 550 for the operating system (OS) of the computing device 500, code 555 for applications running on the operation system including the applications for the editor 150, simulation engine 430 and report generating tool 450 and data 560 generated from the editor 150, simulation engine 430 and/or report generation tool 450. Parts of the applications may be stored in the CPU cache 507 or memory 510 as well, or they may be stored remotely.

The input control 520 may interface with a keyboard 540, a mouse 542, a microphone 544, a camera 546 (e.g., a web camera) and/or other input devices. The computing device 500 may receive, through the input control 520, input data, such as the input data for developing code 415. The computing device 500 may display on the display 535 user interfaces for displaying the code 415 and/or data 435 generated by the editor 150, simulation engine 430 and/or report generating tool 450.

Figure 6:
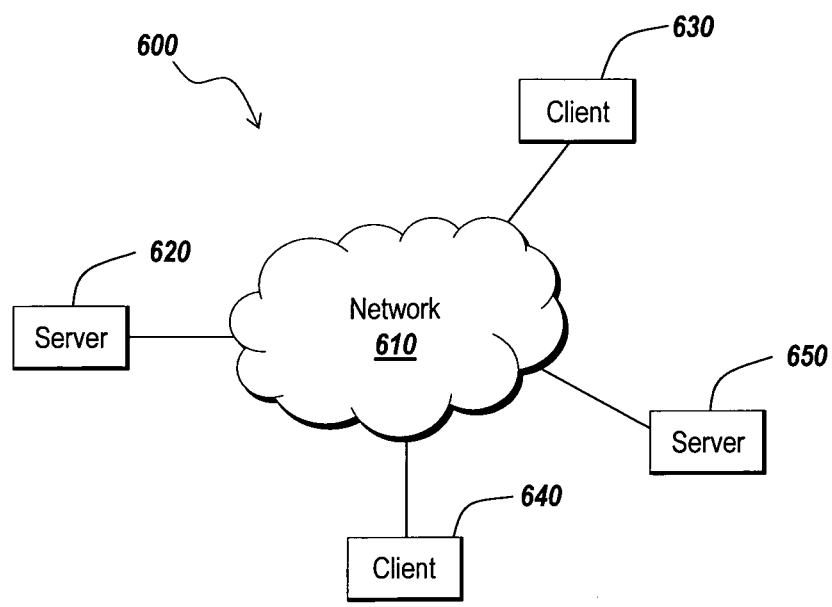
FIG. 6 depicts an exemplary distributed system suitable for practicing distributed implementations of exemplary embodiments.

FIG. 6 is an exemplary network environment 600 (hereinafter environment 600) suitable for a distributed implementation of embodiments of the present invention. The environment 600 may include one or more servers 620/650 coupled to one or more clients 630/640 via a communication network 610. In one implementation, the servers 620/650 and/or the clients 630/640 can be implemented via the computing device 500 (FIG. 5). The network interface 530 and the modem 525, of the computing device 500, may enable the servers 620/650 to communicate with the clients 630/640 through the communication network 610.

The communication network 610 may include Internet, intranet, Local Area Network (LAN), Wide Area Network (WAN), Metropolitan Area Network (MAN), wireless network (e.g., using IEEE 802.11 and/or Bluetooth), etc. In addition, the communication network 610 may use middleware, such as Common Object Request Broker Architecture (CORBA) or Distributed Component Object Model (DCOM) to allow a computer on the communication network 610 to communicate directly with another computer or a device that is connected to the communication network 610.

In the environment 600, the servers 620/650 may provide the clients 630/640 with software components or products under a particular condition, such as a license agreement. The software components or products may include those for the editor 150, the simulation engine 430 and/or report generating tool 450. For example, the client 640 may develop code in a computer programming language using the editor 150 provided by the server 620 and may send the server 620 the code 415 for evaluation and/or report generation. The server 620 may return the evaluation data 435 that results from an evaluation of the code 415 and/or send the report document 455 to the client 640 and the client 640 may display the evaluation data 435 and/or the generated report document 455.

When the server 620 generates the report document 455, the server 620 may save the report document 455 as a file on server 620 prior to returning the report document 455 to the client 640. Alternatively, the server 620 may return the report document 455 to the client 640 without saving the report document 455 as a file.

As discussed above, exemplary embodiments enables generating a report document based on code 415 that is provided by the user and data 435 that is collected and optionally saved from the evaluation of the code 415. The generation of report document 455 may integrate the code with the data 435 to produce a formatted document.

Figure 7:
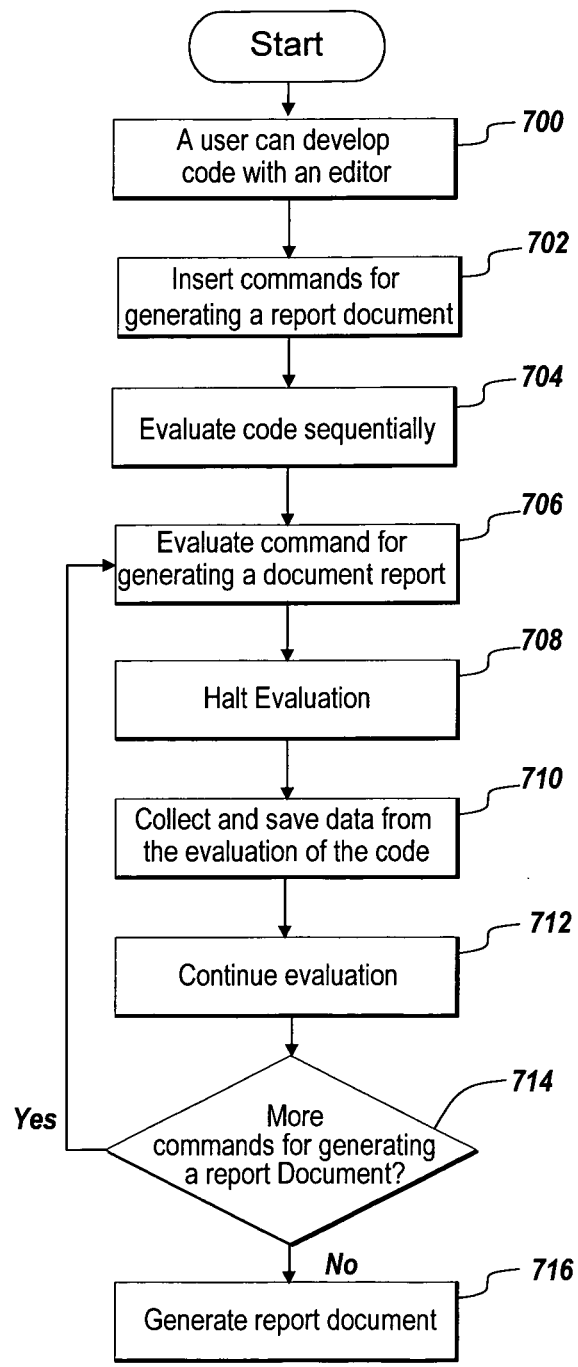
FIG. 7 is an exemplary flow diagram that depicts generating a report document that includes code as well as evaluation results of the code.

FIG. 7 is a flow diagram that illustrates exemplary steps generating the report document 455 that includes data 435 that results from the evaluation of the code 415 that was developed. The report document 455 may also include portions of the code 415. A user can develop code 415 with the editor 150 (step 700). The code 415 can include multi-line statements, which can include, but are not limited to "while" loops, "if" loops, "for" loops, "case" (or "switch") statements, etc.

Commands for generating a report document may be inserted into code 415 (step 702). In one example, a user can insert the commands for generating a report document into the code 415 using the editor 150. In another example, the user may insert delimiting notations into the code 415 and the programming environment 400 may replace the delimiting notations with a command for generating a report document when the code 415 is evaluated. In yet another example, the programming environment 400 can automatically insert the commands for generating a report document into the code 415. When the command for generating a report document is evaluated, data 435 resulting from the evaluation of the code 415 may be collected and saved. A command for generating a report document may cause the evaluation of the code 415 to halt or may not affect the evaluation process. The evaluation may halt to allow for the data 435 resulting for the evaluation of the code 415 to be collected. A command for generating a report document that is inserted in the code 415 may partition a multi-line statement. In this manner, the multi-line statement does not complete evaluation prior to the evaluation of the command for generating code.

The code 415 can be evaluated (step 704). The evaluation of the code 415 reaches the command for generating a report document (step 706) and the evaluation of the code 415 optionally halts (step 708). At this time, the programming environment collects and saves data 435 from the evaluation of the code 415 (step 710). For example, the programming environment 400 can collect and save outputs that are calculated during the evaluation of the code 415, variables and variable values, state information, code coverage information, an evaluation time and/or a call count. The outputs can be intermediate outputs where further evaluation of the code 415 can be used to update the intermediate outputs that are saved.

The evaluation of the code 415 continues after collecting and saving the data 435 (step 712). If, during the evaluation, another command for generating a report document is encountered (step 714), the process repeats from step 406. Otherwise, the report document 455 is generated that includes the data 435 from the evaluation and optionally a portion of the code 415 and/or commented sections from the code 415 (step 716). In one implementation, once the report document 455 is generated, the report document 455 can be stored as a file. In another implementation, an in-memory version of the report document may be generated. In yet another implementation, the report document 455 may be transmitted to another computing device, such as client 630 in environment 600 (FIG. 6).

The evaluation of the code 415 can occur in a base workspace or can occur in a local workspace. A workspace refers to an area, such as a part of a file, a file, multiple files, etc., which include and maintain variables, values, parameter and other aspects of code for evaluation. In one example, the user may develop code 415 that includes a sequence of commands that are evaluated in a base workspace. Data 435 resulting from the evaluation of the sequence of commands in the base workspace may be available for the remaining evaluation and may also be available for use after the evaluation is complete. Alternatively, a user may develop code 415 that defines a function. The evaluation of the function can occur in a separate workspace, which will be referred to herein as the "function workspace". Data 435 resulting from the evaluation of the function may be available in the function workspace and may not accessible from the base workspace. Exemplary embodiments may allow the code 415 to be evaluated "normally" (i.e., the code 415 is evaluated in its entirety as opposed to being evaluated in separate distinct code cells), and therefore, the exemplary embodiments may allow a user to generate the report document 455 from code 415 that may be evaluated in multiple workspaces.

Figure 8A:
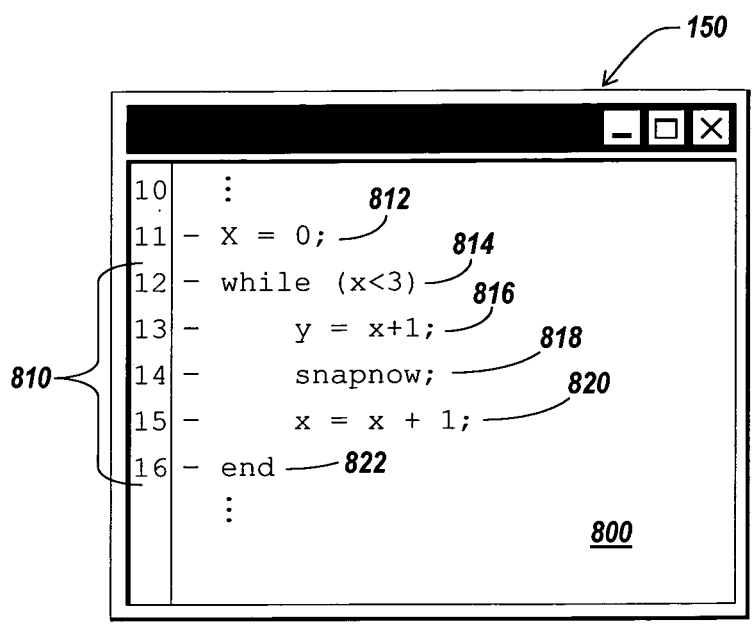
FIG. 8A is an exemplary multi-line statement where a command for generating a report document is inserted in code.

FIG. 8A depicts exemplary code 800 that includes a multi-line statement that may be developed with the editor 150, where a command for generating a report document partitions the multi-line statement. The code 800 includes a code segment 812, a code segment 814, a code segment 816, a code segment 818, a code segment 820 and a code segment 822. The code segments 814, 816, 818, 820 and 822 compose the multi-line statement, which in this example is a "while" loop 810. The code segment 812, initiates a variable "X" to zero. The code segment 818, which represents the command for generating a report document that concerns the code 800, is inserted into the code and partitions the "while" loop 810. In this example, the command for generating a report document is given by "snapnow".

The command for generating a report document command can take any form and the "snapnow" command is merely provided as an exemplary implementation of a command for generating a report document command. A command for generating a report document command can be, for example, a character, string of characters, etc., or can be a geometric shape, such as a circle, a square, a rectangle, a arrow, etc.

Figure 8B:
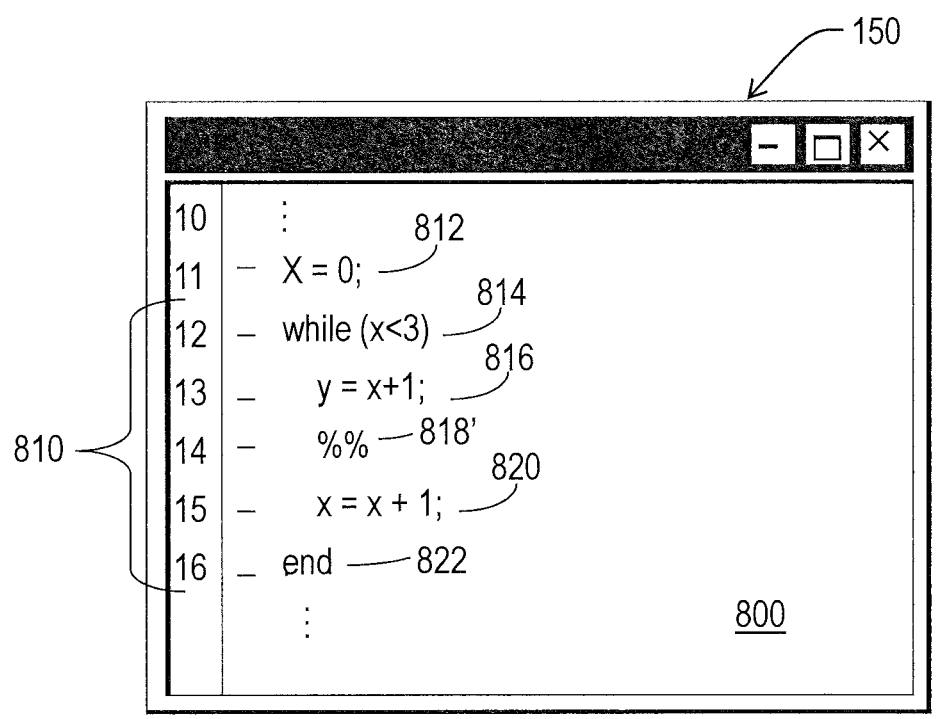
FIG. 8B is an exemplary multi-line statement where a delimiting notation specifies where a command for generating a report document is inserted in code.

FIG. 8B depicts the exemplary code 800 where the user provides delimiting notations to indicate where commands for generating a report document should be inserted. The code 800 includes the code segments 812, 814, 816, 820 and 822. The code 800 also includes a code segment 818' that represents a delimiting notation for indicating where a command for generating a report document should be inserted. The code segments 814, 816, 818', 820 and 822 compose the multi-line statement, which in this example is a "while" loop 810, as discussed above with respect to FIG. 8A. During evaluation of the code 800, the programming environment operates to replace the delimiting notation represented by segment 818' with a command for generating a report document. In this example, the delimiting notation is represented by "%%".

The delimiting notation can take any form and the "%%" notation is merely provided as an exemplary implementation of a delimiting notation. A delimiting notation can be, for example, a character, string of characters, etc., or can be a geometric shape, such as a circle, a square, a rectangle, a arrow, etc. In some instances, the user can divide the code (e.g., code 415) into sections using a delimiting notation and the programming environment 400 may replace the delimiting notations with the commands for generating code during evaluation. For example, the user may create code cells, where the code cells are created based on how the user desires the code (e.g., code 415) and data (e.g., data 435) from the evaluation of the code to be presented in the report document (e.g., report document 455). The code cells are not required to be syntactically complete for independent evaluation. The code cells can partition multi-line statements and/or can be used in code that defines a function. In this example, the programming environment 400 may insert a command for generating a report document at the boundary of each code cell. The commands for generating code can be inserted into the code for evaluation and then can be removed after evaluation.

In some instance, the programming environment 400 may automatically insert commands for generating a report document. For example, a user can develop code (e.g., code 800) and the programming environment 400 can determine where to insert the commands for generating a report document. The programming environment 400 may analyze the code to determine where to insert the commands for generating a report document based on a structure of the code. For example, after a user develops code 415 (FIG. 4), the programming environment 400 can analyze the code and insert a command for generating a report document after each segment of code for which an output is produce. In other implementations, the programming environment 400 may insert commands after segments of code that generate graphs, tables, function calls, new variable definitions, updated variable values, outputs that are textual displays of outputs, etc.

In one embodiment, the automatically inserted commands for generating a report document may not be visible to the user. In other embodiments, the commands for generating a report document may be visible to the user to allow the user to match sections of the report to the associated code segments.

The commands for generating a report document may be set in a file containing the code 800 (FIGS. 8A-B), in an in-memory version of the code 800, or in cases where the code 800 may be compiled, the commands for generating a report document may be set in the compiled version of the code 800.

Referring again to FIGS. 8A-B, when the code 800 is evaluated the "while" loop 810 is evaluated over several iterations based on a condition provide the code segment 814.

Figure 9:
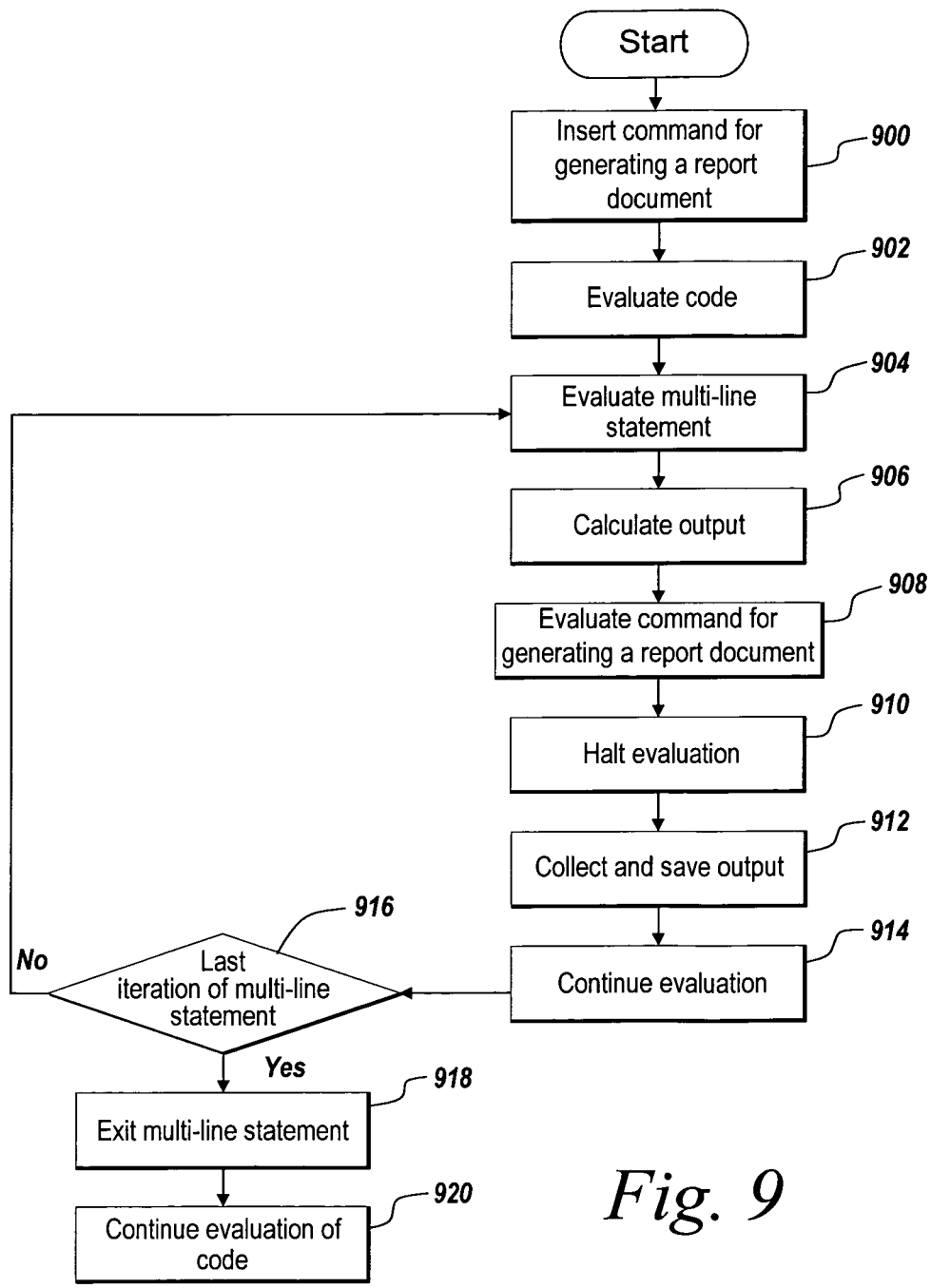
FIG. 9 is a flow diagram that depicts an exemplary evaluation of the multi-line statement of the code in FIGS. 8A-B.

FIG. 9 is a flow diagram that illustrates an exemplary evaluation of the multi-line statement of FIG. 8. The code segment 818 or 818' can be inserted into the code 800 to partition the "while" loop 810 (step 900). The user can begin the evaluation of the code 800 (step 902). Prior to entering the "while" loop 810, the code segment 812 initiates a variable "X" to zero. To enter the "while" loop 810, a code segment 814 is evaluated. During this evaluation a comparison is made between the value of "X" and a constant of 3. For this example, the evaluation of the "while" loop 810 is continuously performed while the value of "X" is less than 3 (i.e., when the condition is true). When the condition is true, the evaluation enters the while loop (step 904). The evaluation of the while loop proceeds to the code segment 816, which defines an output variable "y" as being equal to the value of "X" plus one. The evaluation of the code segment 816 calculates the value of "y" (step 906). Following the evaluation of code segment 816, a code segment 818, which represents the command for generating a report document, is evaluated (step 908), and the evaluation of the code optionally halts (step 910).

At this time, the programming environment can collect and save the current value for the output variable "y", as an intermediate output (step 912). The value of the output variable "y" is equal to one after the first iteration (y=0+1). The evaluation of the code continues by evaluating the code segment 820 (step 914). The code segment 820 increments the value of "X" by one each time it is evaluated. If no more iterations of the "while" loop 810 are required (i.e., if the value of "X" is greater than three) (step 916), the evaluation exits the "while" loop 810 at code segment 822 (step 918), and continues executing the code (step 920). If, however, the "while" loop 810 requires another iteration (i.e., the value of "X" is less than three) (step 916), the process repeats from step 904. For example, the evaluation begins executing the second iteration of the "while" loop 810, where the value of "X" is one (step 904). Another output of the code segment 816 can be calculated (step 906), and the command for generating a report document can be evaluated (step 908), which may cause the evaluation to halt (step 910). The value of the output variable "y" can be collected and saved as another intermediate output (step 912). The value of the output variable "y" equals two after the second iteration (y=1+1). In this example, the programming environment can save each iterative value of the output variable "y" separately. This allows a user to develop a report document that includes the intermediate outputs as well as the last value of the output variable "y".

The evaluation of the code continues (step 914). If no more iterations are required (step 916), the evaluation exists "while" loop 810 (step 918) and continues (step 920) until another command for generating a report document is reached, or until evaluation completes or stops because of, for example, an error. After evaluating the code, a report document is generated that interleaves the data collected at each command for generating a report document with sections of the code. The document can be stored as an in-memory version, a file or any other representation that allows a user to access the report document. Alternatively, in a distributed implementation, the report document can be transmitted over the communication network 610 (FIG. 6) without first storing the report document.

The report document can be generated upon the completion of the evaluation of the code 800, as provided in the above example, or the report document can be generated at another time. For example, the report document can be generated in sections such that after each command for generating a report document is evaluated a section of the report document is generated that includes the data that was collected and saved during from the evaluation of the command for generating a report document. Each subsequent command for generating a report document can add an additional section to the report document until the evaluation and is complete, and therefore the report document is complete.

Embodiments of the present invention may be provided as one or more programs readable by a computing device embodied on or in one or more mediums. The mediums may be, but are not limited to a hard disk, a compact disc, a digital versatile disc, a flash memory card, a Programmable Read Only Memory (PROM), a Random Access Memory (RAM), a Read Only Memory (ROM), a Magnetoresistive Random Access Memory (MRAM), or a magnetic tape. In general, the computer-readable programs may be implemented in any programming language. Some examples of languages that can be used include Python, C, C++, C#, or Java. Further, the computer readable programs can be implemented in a hardware description language such as Verilog or VHDL. The software programs may be stored on or in one or more mediums as object code.

Certain embodiments of the present invention are described above. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method comprising:
   identifying, using a computing device, a section of code for execution;
   inserting, using the computing device, a command into the section of the code, the command partitioning the section of the code into a first portion and a second portion; and
   executing, using the computing device, the section of the code, the executing comprising:
      executing the first portion of the code, the execution of the first portion of the code producing a first graphical output, and
      executing the command, wherein executing the command causes the first portion of the code and the first graphical output to be inserted into a report document.

2. The method of claim 1, wherein:
   the section of the code is executed using multiple workspaces.

3. The method of claim 1, wherein the section of the code further comprises at least one delimiting notation, the method further comprising:
   inserting, programmatically, the command at a location corresponding to the at least one delimiting notation.

4. The method of claim 1, wherein the inserting comprises:
   determining a structure of the section of the code; and
   inserting the command based on the determining.

5. The method of claim 1, wherein the report document is generated in a binary format.

6. A non-transitory computer-readable medium holding instructions that, when executed by a processor, cause the processor to:
   identify a section of code for execution;
   insert a command into the section of the code, the command partitioning the section of the code into a first portion and a second portion; and
   execute the section of the code, the executing comprising:
      executing the first portion of the code, the execution of the first portion of the code producing a first graphical output, and
      executing the command, wherein executing the command causes the first portion of the code and the first graphical output to be inserted into a report document.

7. The medium of claim 6, further holding instructions, that when executed by the processor, cause the processor to:
   execute the section of the code using multiple workspaces.

8. The medium of claim 6, wherein the section of the code further comprises at least one delimiting notation and the medium further holding instructions, that when executed by the processor, cause the processor to:
   insert, programmatically, the command at a location corresponding to the at least one delimiting notation.

9. The medium of claim 6, further holding instructions, that when executed by the processor, cause the processor to:
   determine a structure of the section of the code; and
   insert the command based on the determining.

10. A method comprising:
    executing, using a computing device, a section of code, the section of the code including a multi-line statement and a command, wherein:
       the command partitions the multi-line statement into a first portion of code and a second portion of code;
       the executing comprises:
          executing the first portion of the code, the execution of the first portion of the code producing a first graphical output, and
          executing the command, wherein executing the command causes the first portion of the code and the first graphical output to be inserted into a report document.

11. The method of claim 10, wherein the first graphical output is provided in at least one of: a graph format or a table format.

12. The method of claim 10, wherein the command is generated programmatically.

13. The method of claim 10, wherein the report document is generated in a binary format.

14. The method of claim 10, wherein the first portion of the code defines a function.

15. A computing system comprising:
a processor executing instructions to:
identify a section of code for execution;
insert a command into the section of the code, the command partitioning the section of the code into a first portion and a second portion; and
execute the section of the code, the executing comprising:
executing the first portion of the code, the execution of the first portion of the code producing a first graphical output, and
executing the command, wherein executing the command causes the first portion of the code and the first graphical output to be inserted into a report document.

16. The system of claim 15, wherein the first portion of the code defines a function and the processor executes further instructions to execute the function and collect data related to the function.

17. A non-transitory computer-readable medium holding instructions that, when executed by a processor, cause the processor to:
execute a section of code, the section of the code comprising a multi-line statement and a command, wherein:
the command partitions the multi-line statement into a first portion of code and a second portion of code;
the executing comprises:
executing the first portion of the code, the execution of the first portion of the code producing a first graphical output, and
executing the command, wherein executing the command causes the first portion of the code and the first graphical output to be inserted into a report document.

18. The medium of claim 17, wherein the command is generated programmatically.

19. The medium of claim 17 wherein the data is represented in the report document as at least one of a graph or table.

20. The medium of claim 17, wherein the report document is generated in a binary format.

21. The medium of claim 17, wherein the first portion of the code defines a function.

22. A non-transitory computer-readable medium holding instructions that when executed by a processor, cause the processor to:
obtain code comprising a plurality of commands, where:
a first of the plurality of commands is included in a first portion of the code and a second of the plurality of commands is included in a second portion of the code; and
execute the code, the executing comprises:
executing the first portion of the code, the execution of the first portion of the code producing a first graphical output,
executing the first of the plurality of commands, wherein executing the first of the plurality of commands causes the first portion of the code and the first graphical output to be inserted into a report document,
executing the second portion of the code, the execution of the second portion of the code producing a second graphical output, and
executing the second of the plurality of commands, wherein executing the second of the plurality of commands causes the second portion of the code and the second graphical output to be inserted into the report document.

23. The medium of claim 22, further holding instructions that when executed by the processor, cause the processor to:
execute the code using multiple workspaces.

* * * * *

UNITED STATES PATENT AND TRADEMARK OFFICE
CERTIFICATE OF CORRECTION

PATENT NO. : 8,762,956 B1  
APPLICATION NO. : 11/700276  
DATED : June 24, 2014  
INVENTOR(S) : Matthew J. Simoneau et al.

Page 1 of 1

It is certified that error appears in the above-identified patent and that said Letters Patent is hereby corrected as shown below:

In the Claims

Column 14, line 3 (in Claim 1), delete "execution of" and insert --executing-- in lieu thereof Column 14, line 6 (in Claim 1), insert --the-- after "wherein"

Column 14, line 30 (in Claim 6), delete "execution of" and insert --executing-- in lieu thereof Column 14, line 33 (in Claim 6), insert --the-- after "wherein"

Column 14, line 56 (in Claim 10), delete "execution of" and insert --executing-- in lieu thereof Column 14, line 59 (in Claim 10), insert --the-- after "wherein"

Column 15, line 13 (in Claim 15), delete "execution of" and insert --executing-- in lieu thereof Column 15, line 16 (in Claim 15), insert --the-- after "wherein"

Column 15, line 32 (in Claim 17), delete "execution of" and insert --executing-- in lieu thereof Column 15, line 35 (in Claim 17), insert --the-- after "wherein"

Column 16, line 3 (in Claim 19), delete "data" and insert --first graphical output-- in lieu thereof Column 16, line 4 (in Claim 19), insert --a-- after "or"

Column 16, line 18 (in Claim 22), delete "execution of" and insert --executing-- in lieu thereof Column 16, line 22 (in Claim 22), insert --the-- after "wherein"

Column 16, lines 26-27 (in Claim 22), delete "execution of" and insert --executing-- in lieu thereof Column 16, line 31 (in Claim 22), insert --the-- after "wherein"

Signed and Sealed this  
Fourteenth Day of October, 2014

Michelle K. Lee  
*Deputy Director of the United States Patent and Trademark Office*